(12) United States Patent
Park (10) Patent No.: US 11,534,949 B2
(45) Date of Patent: Dec. 27, 2022

(54) INJECTION MOLDING APPARATUS (71) Applicant: Samsung Electronics Co., Ltd., Suwon-si (KR)

(72) Inventor: Yong Joo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 15/733,543

(22) PCT Filed: Nov. 26, 2018

(86) PCT No.: PCT/KR2018/014650
§ 371 (c)(1),
(2) Date: Aug. 24, 2020

(87) PCT Pub. No.: WO2019/164099
PCT Pub. Date: Aug. 29, 2019

(65) Prior Publication Data
US 2020/0391424 A1 Dec. 17, 2020

(30) Foreign Application Priority Data
Feb. 23, 2018 (KR) .......... 10-2018-0021991

(51) Int. Cl.
B29C 45/76 (2006.01)
B29C 45/17 (2006.01)
B29C 45/40 (2006.01)

(52) U.S. Cl.
CPC ...... *B29C 45/7626* (2013.01); *B29C 45/1775* (2013.01); *B29C 45/4005* (2013.01); *B29C 2045/1776* (2013.01)

(58) Field of Classification Search
None
See application file for complete search history.

(56) References Cited

U.S. PATENT DOCUMENTS

| 2001/0010172 | A1  | 8/2001 | Kawasaki et al. |
| 2017/0261338 | A1* | 9/2017 | Cao .......... F02M 26/54 |
| 2018/0133786 | A1* | 5/2018 | Amezawa ...... B22D 17/32 |

FOREIGN PATENT DOCUMENTS

| JP | 2000309039 A | 11/2000 |
| JP | 3662142 B2 | 6/2005 |
| JP | 4305746 B2 | 7/2009 |

(Continued)

OTHER PUBLICATIONS

International Search Report and Written Opinion of the International Searching Authority in connection with International Application No. PCT/KR2018/014650 dated Apr. 3, 2019, 10 pages.

(Continued)

*Primary Examiner* — Armand Melendez (57) ABSTRACT

Provided is an injection molding apparatus including a first mold and a second mold, an ejector plate provided on the first mold to reciprocate and configured to eject an injection molded object between the first mold and the second mold, and a sensor device having a moving sensor detachably attached to the ejector plate, and configured to detect a position of the ejector plate, wherein the sensor device is detachably attached to the first mold and the ejector plate by a magnetic force.

11 Claims, 11 Drawing Sheets (56) References Cited

FOREIGN PATENT DOCUMENTS

KR    10-1265459 B1    5/2013

OTHER PUBLICATIONS

Korean Intellectual Property Office, "Notice of Preliminary Rejection," dated Jul. 21, 2022, in connection with Korean Patent Application No. 10-2018-0021991, 31 pages.
Dumont et al.," Acceleration Measurement Optimization: Mounting Considerations and Sensor Mass Effect" Kistler Group, 10 pages.
Vallen Systeme, "Accessories for Acoustic Emission Systems," Specification, Feb. 2016, 26 pages.

* cited by examiner

INJECTION MOLDING APPARATUS

CROSS-REFERENCE TO RELATED APPLICATIONS

This application is a 371 National Stage of International Application No. PCT/KR2018/014650, filed Nov. 26, 2018, which claims priority to Korean Patent Application No. 10-2018-0021991, filed Feb. 23, 2018, the disclosures of which are herein incorporated by reference in their entirety.

BACKGROUND

1. Field

The disclosure relates to an injection molding apparatus, and more specifically, to an injection molding apparatus with an improved mounting structure.

2. Description of Related Art

In general, an injection molding apparatus refers to an apparatus that is designed to inject a molten resin into a cavity formed in a mold to manufacture an injection object corresponding to the cavity.

The mold includes upper and lower cores provided to be coupled to each other and forming a cavity therebetween that corresponds a shape of an injection object to be manufactured, and an injection device for injecting a molten resin into the cavity.

The injection molding apparatus is provided with an injection object ejecting member to separate a molded injection object from the injection mold. Over the injection molding processes, the injection object ejecting member makes a reciprocating motion, and in order to detect the original position of the injection object ejecting member, a sensor device may be provided. However, since the sensor device needs to be installed on each injection molding apparatus to be operated, the time and cost are additionally incurred for sensor device installation. In addition, when the sensor device is not installed or incorrectly installed, the injection molding apparatus may have malfunction or failure, resulting in a lot of time and cost for recovery.

SUMMARY

Therefore, it is an object of the disclosure to provide an injection molding apparatus having a sensor device with an improved mounting structure.

It is another object of the disclosure to provide an injection molding apparatus for preventing the malfunction of an ejector plate.

According to an aspect of the disclosure, there is provided an injection molding apparatus including: a first mold and a second mold; an ejector plate provided on the first mold to reciprocate and configured to eject an injection molded object between the first mold and the second mold; and a sensor device having a moving sensor detachably attached to the ejector plate, and configured to detect a position of the ejector plate.

The moving sensor may be detachably attached to the ejector plate by a magnetic force.

The sensor device may include a fixed sensor located on the first mold to detect the moving sensor, and detachably attached to the ejector plate.

The sensor device may include a mounting device allowing the fixed sensor and the moving sensor to be detachably attached to the first mold and the ejector plate, respectively.

The mounting device may include: a mounting bracket fixedly disposed on the fixed sensor and the moving sensor; and a mounting magnet coupled to the mounting bracket, the mounting magnet allowing the fixed sensor and the moving sensor to be detachably attached to the first mold and the ejector plate, respectively.

When an attractive force of the mounting magnet is released, the moving sensor and the fixed sensor movable may be allowed to move.

The mounting bracket may include: a bracket body; and a mounting groove formed on one surface of the bracket body facing a contact target surface of the first mold or the ejector plate, the mounting groove into which the mounting magnet is inserted.

The mounting device may include a first mounting bracket and a second mounting bracket fixed to the fixed sensor and the moving sensor, and the fixed sensor may include: a first fixed sensor body fixed to the first mounting bracket and a second fixed sensor body protruding from the first fixed sensor body toward the ejector plate; and a first sensor located on a lower surface of the second fixed sensor body.

The moving sensor may include: a moving sensor body fixed to the second mounting bracket; and a second sensor located on an upper surface of the moving sensor body, configured to be detected by the first sensor.

The ejector plate may move between a standby position and a separation position to which the ejector plate is moved from the standby position to press the molded object to thereby separate the molded object from the first mold, and the first sensor and the second sensor may be provided to face each other on the standby position.

The first mold may include: a core forming one surface of a cavity configured to form an injection object; a stand supporting the core; and a base spaced apart from the stand to form an accommodation space that allows the ejector plate to be movable, wherein the fixed sensor may be provided to be located on the base.

The mounting device may include a mounting magnet having one surface come into contact with a lower surface of the fixed sensor and an other surface come into contact with a contact target surface of the first mold or the ejector plate.

The mounting device may include: a mounting bracket including an insertion space and a cover covering the insertion space, and fixedly disposed on the sensor device; and a mounting magnet disposed in the insertion space, the mounting magnet disposed to be hidden by the cover without being exposed to an outside.

The mounting device may include an adhesive.

As is apparent from the above, the mounting structure of the sensor device is improved, so that the efficiency of the injection molding operation can be enhanced.

The efficiency of the injection molding operation is enhanced, so that the productivity can be improved.

The time required for installation of the injection molding apparatus is reduced, so that the operating time of the injection molding apparatus can be increased.

One sensor device can be applied to injection molding apparatuses of various shapes.

DETAILED DESCRIPTION

The embodiments set forth herein and illustrated in the configuration of the present disclosure are only the most preferred embodiments and are not representative of the full the technical spirit of the present disclosure, so it should be understood that they may be replaced with various equivalents and modifications at the time of the disclosure.

Throughout the drawings, like reference numerals refer to parts or components having like features.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

Hereinafter, embodiments according to the disclosure will be described in detail with reference to the accompanying drawings.

Figure 1:
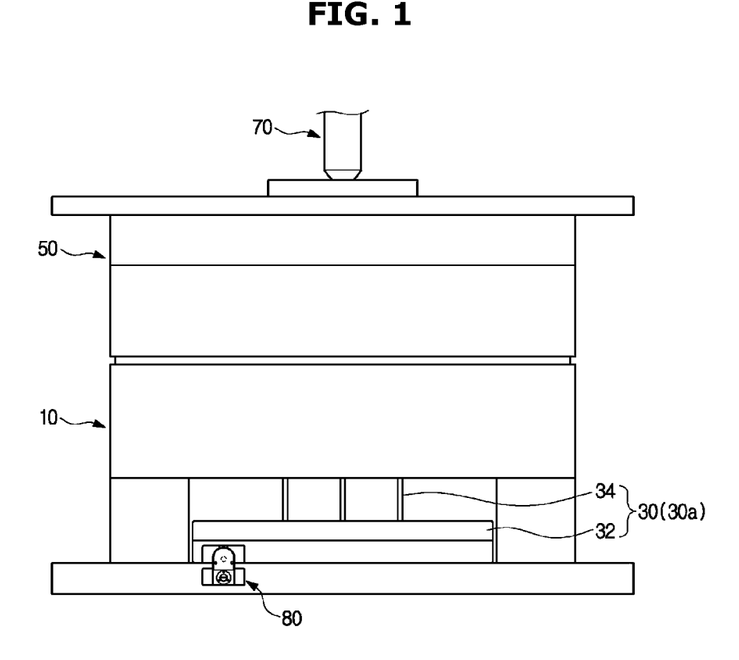
FIG. 1 is a front view illustrating an injection molding apparatus according to an embodiment of the disclosure.
Figure 2:
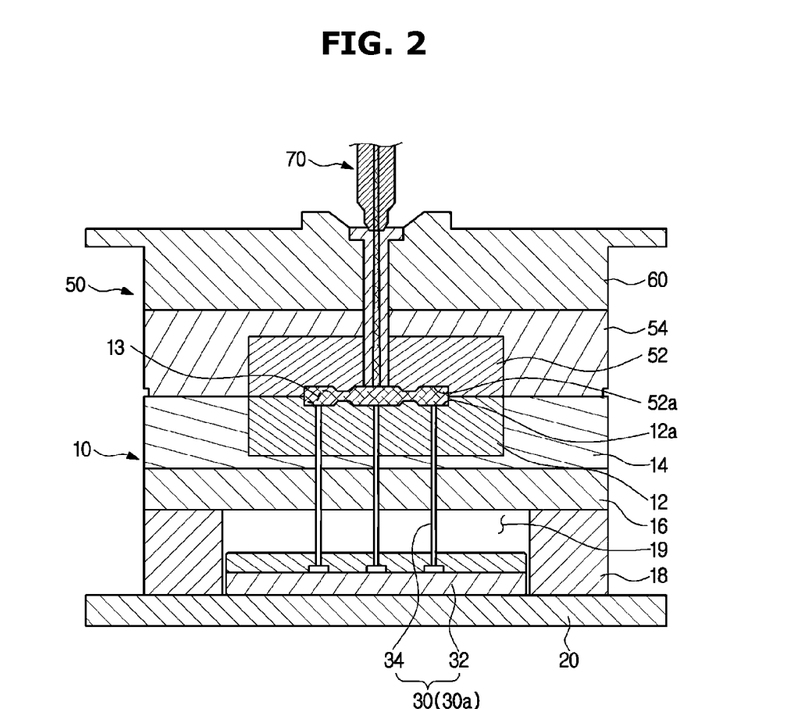
FIG. 2 is a cross-sectional view illustrating an injection molding apparatus according to an embodiment of the disclosure.
Figure 3:
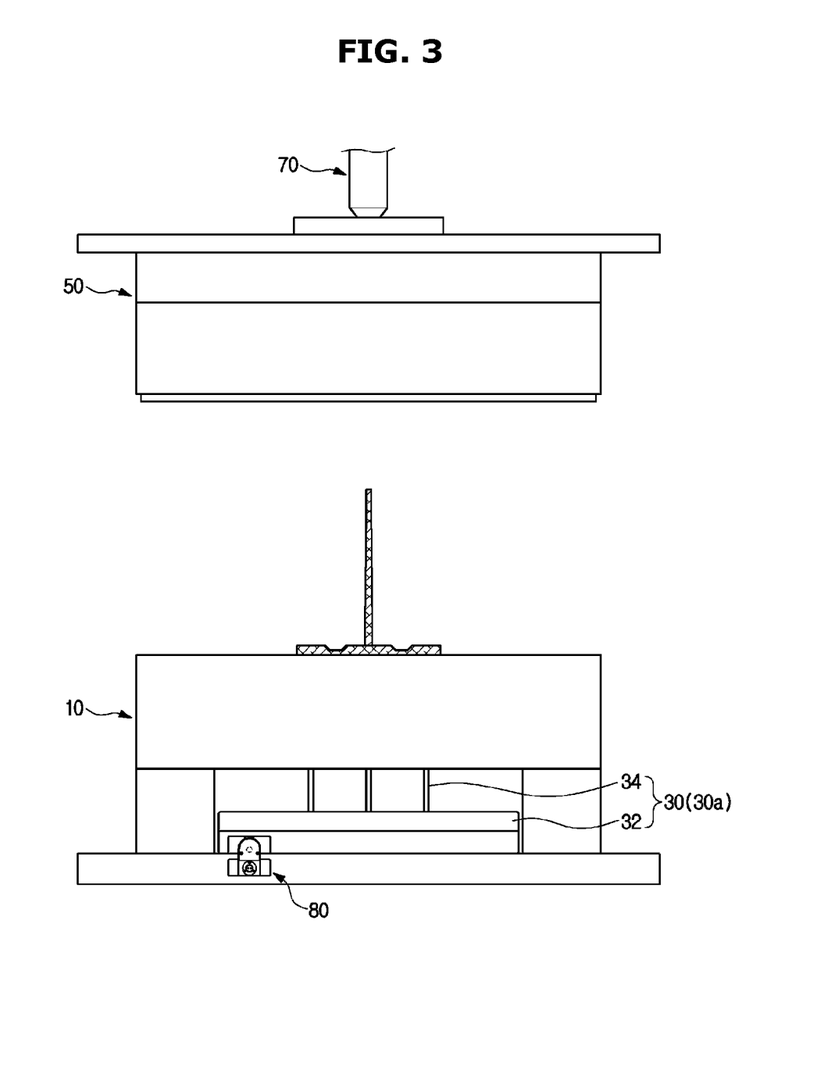
FIG. 3 is a front view illustrating an injection molding apparatus in a mold opening process according to an embodiment of the disclosure.
Figure 4:
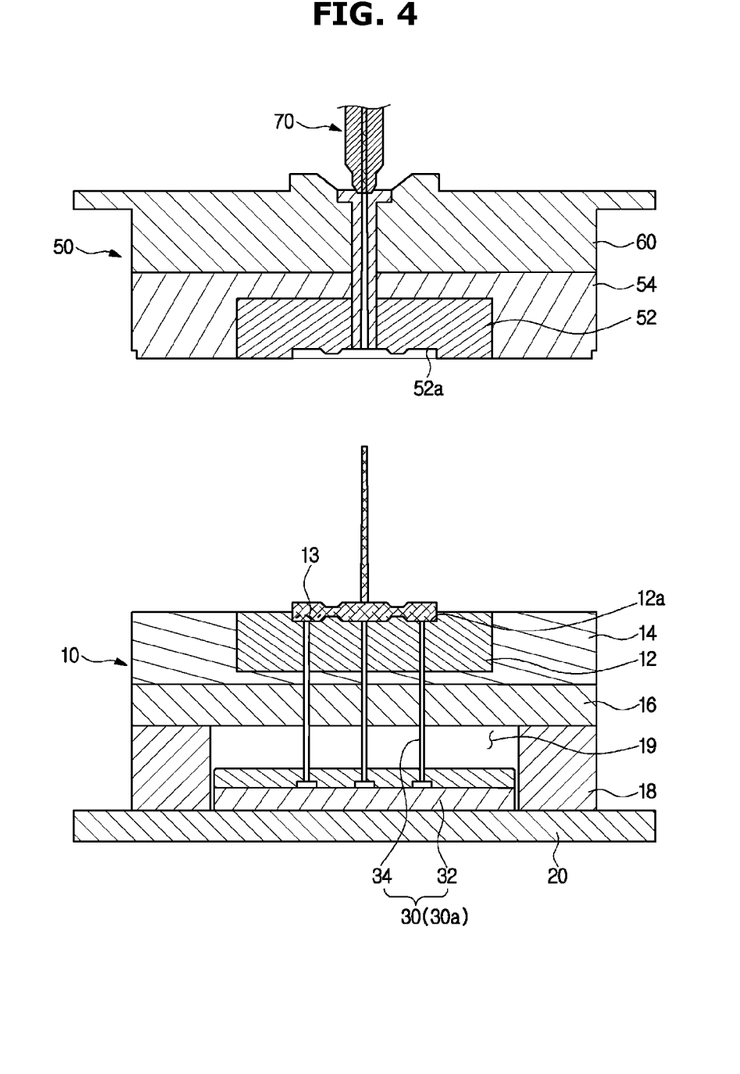
FIG. 4 is a cross-sectional view illustrating an injection molding apparatus in a mold opening process according to an embodiment of the disclosure.
Figure 5:
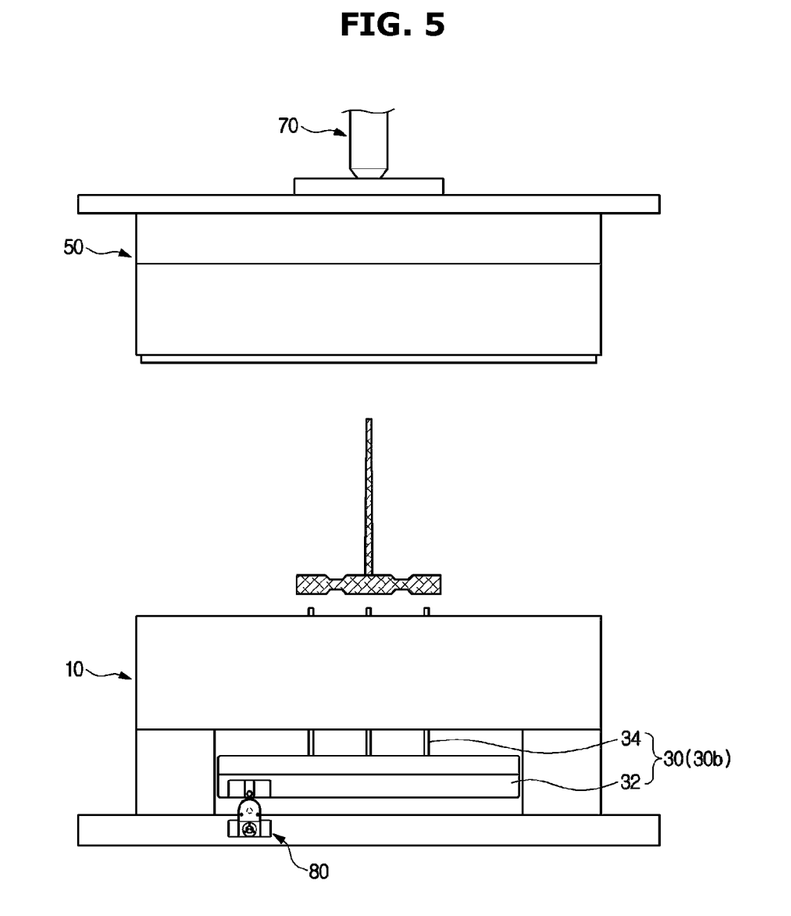
FIG. 5 is a front view an injection molding apparatus in an ejecting process according to an embodiment of the disclosure.
Figure 6:
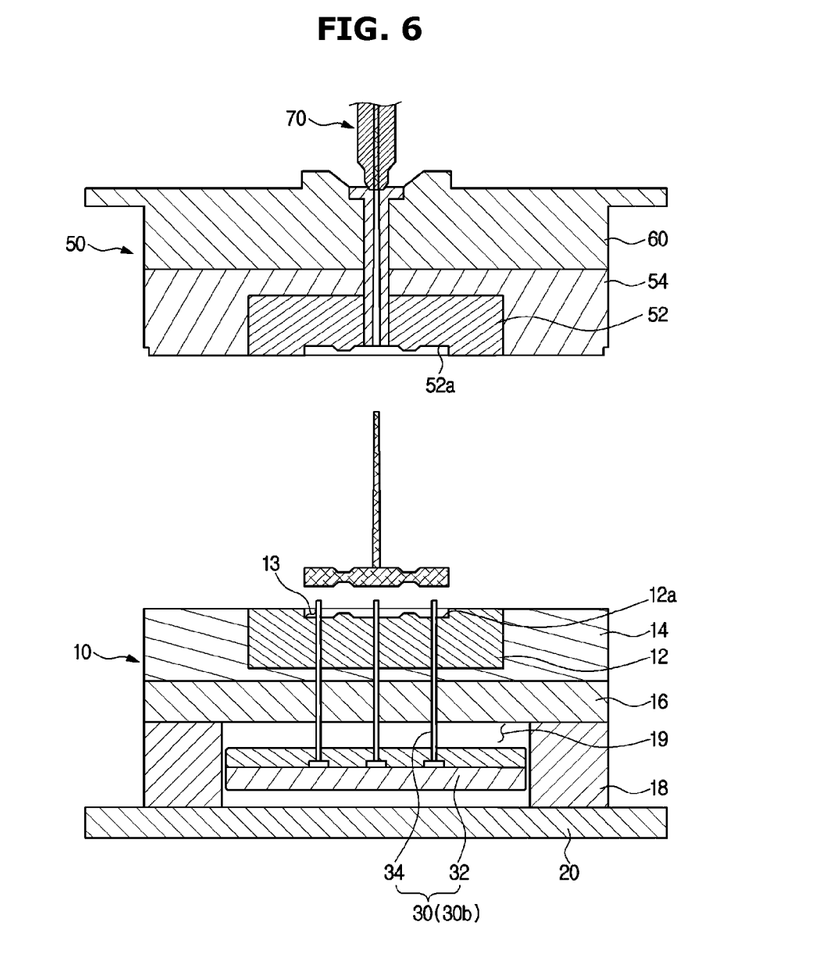
FIG. 6 is a cross-sectional view illustrating an injection molding apparatus in an ejecting process according to an embodiment of the disclosure.

FIG. 1 is a front view illustrating an injection molding apparatus according to an embodiment of the disclosure, FIG. 2 is a cross-sectional view illustrating an injection molding apparatus according to an embodiment of the disclosure, FIG. 3 is a front view illustrating an injection molding apparatus in a mold opening process according to an embodiment of the disclosure, FIG. 4 is a cross-sectional view illustrating an injection molding apparatus in a mold opening process according to an embodiment of the disclosure, FIG. 5 is a front view an injection molding apparatus in an ejecting process according to an embodiment of the disclosure, and FIG. 6 is a cross-sectional view illustrating an injection molding apparatus in an ejecting process according to an embodiment of the disclosure.

An injection molding apparatus 1 may include first and second molds 10 and 50. The injection molding apparatus 1 may injection-mold a molded object through the first and second molds 10 and 50.

The first mold 10 may be provided as a moving-side mold that is provided to be movable. The second mold 50 may be provided as a fixed-side mold restrained in position. However, the arrangement of the first and second molds 10 and 50 is not limited.

The first mold 10 includes a first core 12, a first mold plate 14 located at a periphery of the first core 12 to accommodate the first core 12, and a support plate 16 supporting the first core 12 and the first mold plate 14. In addition, the first mold 10 may include a first base 20 and a space block 18 located between the base plate 16 and the first base 20 to support the base plate 16.

The first mold 10 has an accommodating portion 19 in which an ejecting device 30 is movably accommodated. The accommodating portion 19 may be located between the base plate 16 and the first base 20 and may be formed by the space block 18.

The ejecting device 30 may include an ejector plate 32. The ejector plate 32 may be configured to reciprocate in the accommodating portion 19. The ejecting device 30 may include an ejector pin 34 provided on the ejector plate 32 so as to make contact with an injection object. One end of the ejector pin 34 is fixed to the ejector plate 32, and the other end of the ejector pin 34 is configured to press a molded object during an ejecting process of the injection molding apparatus 1 to separate the molded object from the first mold 10. The ejector pin 34 may be provided in plural.

The second mold 50 includes a second core 52, a second mold plate 54 located at the periphery of the second core 52 to accommodate the second core 52, and a second base 60 supporting the second core 52 and the second mold plate 54.

The first core 12 and the second core 52 may be provided at opposite positions. One of the first core 12 and the second core 52 may be movably provided. In the present embodiment, the first mold 10 is movably provided, and thus the first core 12 is movably provided.

The first core 12 and the second core 52 may be coupled to each other to form a cavity having a shape corresponding to that of an injection object to be manufactured. The first core 12 and the second core 52 may include a first molding surface 12a and a second molding surface 52a, respectively, that form the cavity.

The injection molding apparatus 1 may include an injection device 70. The injection device 70 is configured to inject a molten resin into the cavity. The injection device 70 may be installed on the second mold 50 and configured to inject a molten resin into the cavity.

With such a configuration, the injection molding apparatus 1 produces an injection object through processes, including mold closing, injection, cooling, mold opening, and ejecting. The mold closing is a process of allowing the first mold 14 to come into close contact with the second mold 54, and the injection is a process of injecting a molten resin into the cavity through the injection device 70. The cooling is a process of cooling the molten resin injected into the cavity, and the mold opening is a process of separating the first mold plate 14 from the second mold plate 54. The ejecting is a process of separating the injection object from the mold by moving the ejecting device 30 to separate the injection object away from the cavity 13.

Figure 7:
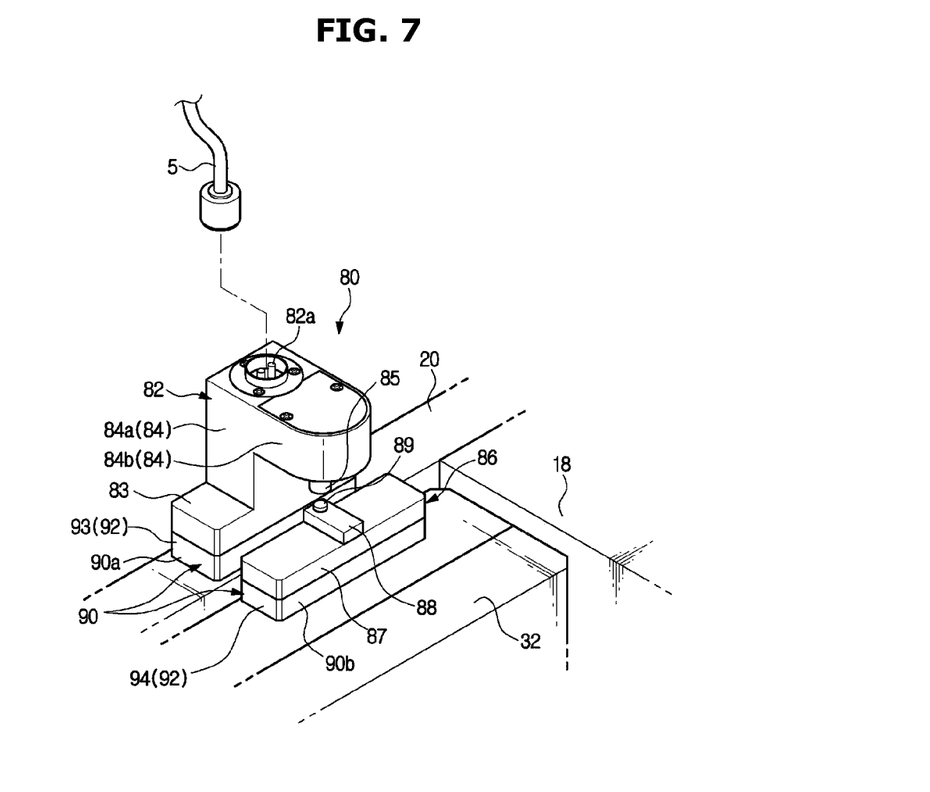
FIG. 7 is a perspective view illustrating a sensor device of an injection molding apparatus according to an embodiment of the disclosure.
Figure 8:
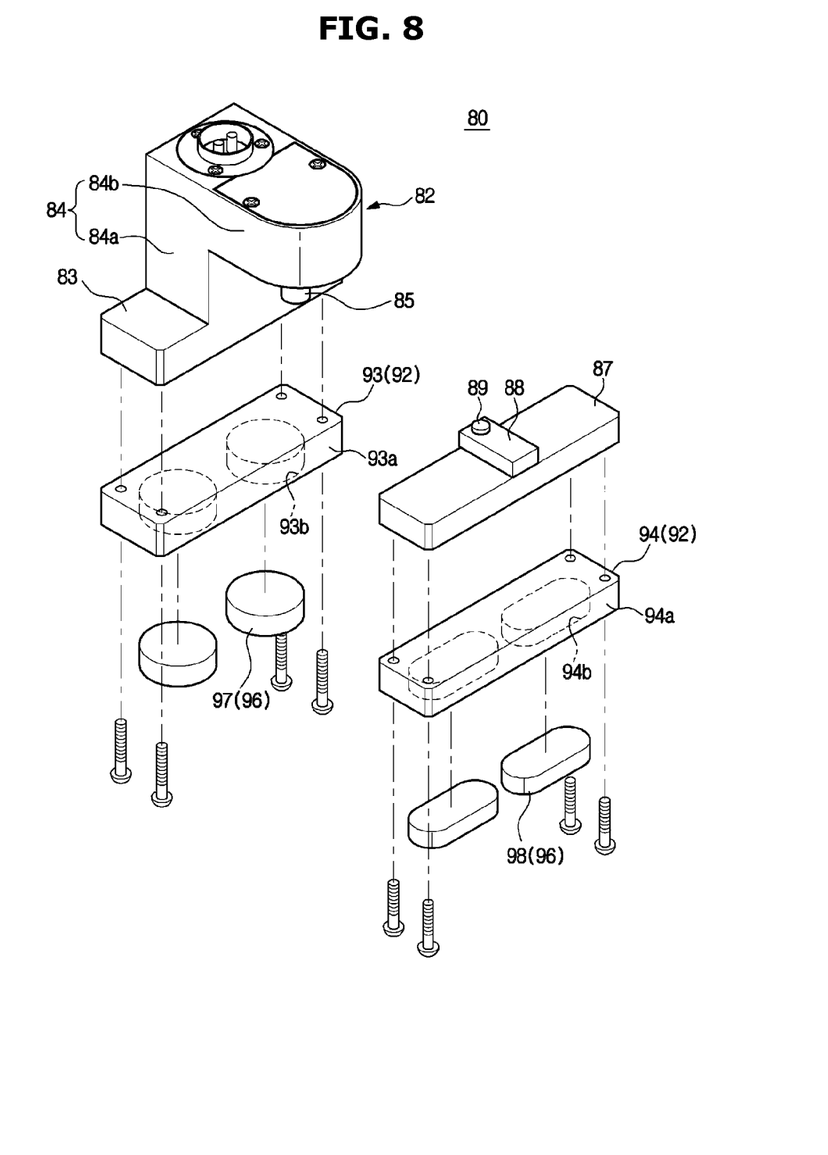
FIG. 8 is an exploded perspective view illustrating a sensor device of an injection molding apparatus according to an embodiment of the disclosure.
Figure 9:
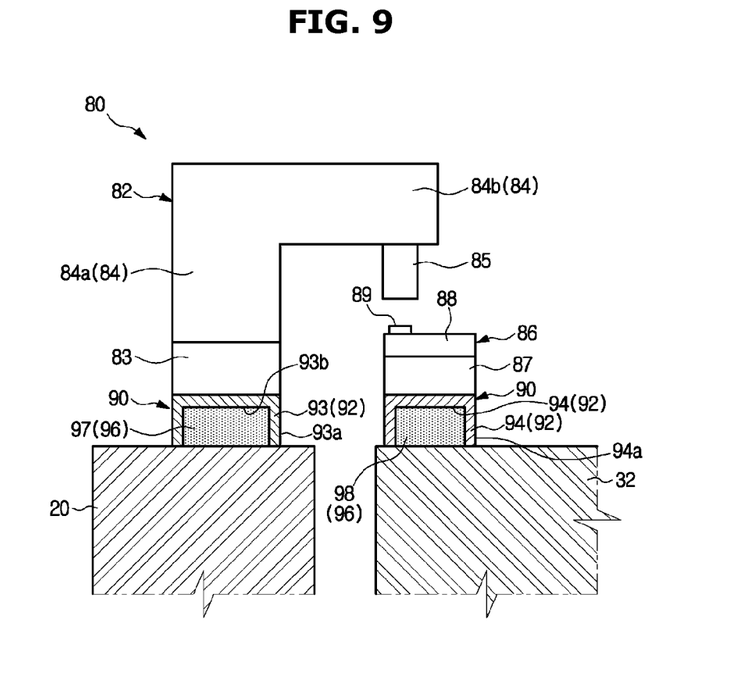
FIG. 9 is a cross-sectional view illustrating an injection molding apparatus according to an embodiment of the disclosure.

FIG. 7 is a perspective view illustrating a sensor device of an injection molding apparatus according to an embodiment of the disclosure, FIG. 8 is an exploded perspective view illustrating a sensor device of an injection molding apparatus according to an embodiment of the disclosure, and FIG. 9 is a cross-sectional view illustrating an injection molding apparatus according to an embodiment of the disclosure.

The injection molding apparatus 1 may include a sensor device 80. The sensor device 80 is configured to detect the movement of the ejector plate 32 in the process of ejecting the injection object. The ejector plate 32 may move from a standby position 30a and a separation position 30b to which the ejector plate 32 is moved from the standby position 30a to press the molded object to separate the molded object from the first mold 10.

The sensor device 80 may include a fixed sensor 82 disposed on the first mold 10 and a moving sensor 86 disposed on the ejector plate 32.

The fixed sensor 82 may include a fixed sensor body 84 and a first sensor 85. The fixed sensor body 84 may be located on the first mold 10. The fixed sensor body 84 may be configured to support the first sensor 85. In addition, the fixed sensor body 84 may include a first fixed body 84a and a second fixed body 84b that is bent from the first fixed body 84a and protrudes toward the ejector plate 32. The first sensor 85 may be located on a lower surface of the second fixed body 84b.

The fixed sensor 82 may include a fixed sensor base 83 coupled to a mounting device 90, which will be described below. The first fixed body 84a may be configured to protrude from the fixed sensor base 83. The fixed sensor base 83 is configured to have a cross-sectional area larger than that of the fixed sensor body 84 such that the fixed sensor 82 is stably mounted on the first mold 10. With the large area of the fixed sensor base 83 and the mounting device 90, an installation space of a fixed magnet 97 may be provided to be large, so that the fixed sensor 82 may be stably installed on the first mold 10.

The moving sensor 86 may include a moving sensor body 88 and a second sensor 89.

The moving sensor body 88 may be located on the ejector plate 32. The moving sensor body 88 may be configured to support the second sensor 89. The second sensor 89 may be located on an upper surface of the moving sensor body 88. With such a configuration, when the ejector plate 32 is in the standby position 30a, the first and second sensors 85 and 89 may be configured to face each other. In the process of the ejector plate 32 moving between the standby position 30a and the separation position 30b, the first and second sensors 85 and 89 detect the distance between each other to determine whether the ejector plate 32 has returned to the original position. The first and second sensors 85 and 89 may be provided as a contact type. When provided as a non-contact type, the first and second sensors 85 and 89 may employ a magnetic sensor.

The moving sensor 86 may include a moving sensor base 87 coupled to the mounting device 90, which will be described below. The moving sensor body 88 may be configured to protrude from the moving sensor base 87. The moving sensor base 87 is configured to have a cross-sectional area larger than that of the moving sensor body 88 such that the moving sensor 86 is stably mounted on the ejector plate 32. With the large area of the moving sensor base 87 and the mounting device 90, an installation space of a moving magnet 98 is provided to be large, so that the moving sensor 86 may be stably installed on the ejector plate 32.

The sensor device 80 may include the mounting device 90. Whenever the injection molding apparatus 1 is installed or dismantled, the sensor device 80 needs to be installed or dismantled together with the injection molding apparatus 1, which may reduce the operating time of the injection molding apparatus 1 in proportion to the added installation time. In addition, when the sensor device 80 is not mounted, the injection molding apparatus 1 may have a failure or shortened life in association with malfunction of the ejector plate 32. The mounting device 90 is configured such that the sensor device 80 is attached to and detached from a mold by a magnetic force, thereby facilitating installation and removal of the sensor device 80. As a result, the time required for installing the sensor device 80 on the mold may be reduced, and an additional configuration, such as a coupling hole for mounting or installing the sensor device 80 to the injection molding apparatus 1, may be omitted The mounting device 90 includes a fixed mounting device 90a for mounting the fixed sensor 82 to the first mold 10 and a moving mounting device 90b for mounting the moving sensor 86 to the ejector plate 32. The mounting device 90 may be configured such that the sensor device 80 is detachable from each of the first mold 10 and the ejector plate 32.

The mounting device 90 may include a mounting magnet 96 such that the sensor device 80 is easily separated from and mounted to the first mold 10 and the ejector plate 32. The mounting device 90 may be configured to be detachable from the first mold 10 and the ejector plate 32 by the mounting magnet 96. That is, through the magnetic force of the mounting magnet 96, the fixed sensor 82 is attached to the first mold 10, and the moving sensor 86 is attached to the ejector plate 32. In the present embodiment, the mounting device 90 is illustrated as being configured to separate or mount the sensor device 80 using the magnetic force of the mounting magnet 96. However, the disclosure is not limited thereto, and the mounting device 90 may include an adhesive. The adhesive may include a double-sided tape.

The mounting device 90 may include a mounting bracket 92. The mounting bracket 92 is configured such that the mounting magnet 96 is fixed to the fixed sensor 82 and the moving sensor 86. The mounting bracket 92 may include a fixed bracket 93 fixed to the fixed sensor 82 and a moving bracket 94 fixed to the moving sensor 86. The fixed bracket 93 and the moving bracket 94 may be screwed to the fixed sensor 82 and the moving sensor 86, respectively. However, the method of coupling the fixed sensor 82, the moving sensor 86, and the mounting bracket 92 is not limited thereto. The mounting bracket 92 may be variously configured as long as it can fix the mounting magnet 96 to the fixed sensor 82 and the moving sensor 86.

The fixed bracket 93 is illustrated as being coupled to the fixed sensor base 83, but is not limited thereto. For example, the fixed bracket 93 may be directly coupled to the fixed sensor body 84 without the configuration of the fixed sensor base 83. In addition, the moving bracket 94 is illustrated as being coupled to the moving sensor base 87, but is not limited thereto. For example, the moving bracket 94 may be directly coupled to the moving sensor body 88 without the configuration of the moving sensor base 87.

The mounting bracket 92 may include bracket bodies 93*a* and 94*a* and mounting grooves 93*b* and 94*b* forming concave spaces in the bracket bodies 93*a* and 94*a* into which the mounting magnet 96 is inserted. The bracket bodies 93*a* and 94*a* may include a fixed bracket body 93*a* forming the body of the fixed bracket 93 and a moving bracket body 94*a* forming the body of the moving bracket 94. The mounting grooves may include a first mounting groove 93*b* formed in the fixed bracket 93 and a second mounting groove 94*b* formed in the moving bracket 94. The mounting grooves 93*b* and 94*b* may be formed in a shape corresponding to the shape of the mounting magnet 96.

The mounting magnet 96 is configured to be inserted into the mounting grooves 93*b* and 94*b* and fixed to the mounting bracket 92. The mounting magnet 96 may include a fixed magnet 97 disposed on the fixed bracket 93 and a moving magnet 98 disposed on the moving bracket 94.

The sensor device 80 may include a connection line (5 in FIG. 7). The connection line 5 may connect the sensor device 80 to a control unit. Information about detecting a return of the ejector plate 32 to the original position by the sensor device 80 is transmitted to the control unit through the connection line 5. The control unit may control the repetitive movement of the ejector plate 32 through the corresponding information. The connection line 5 may be connected to a connection coupling portion 82*a* formed at one side of the fixed sensor 82.

The sensor device 80 may include a tester (not shown). The tester (not shown) may be connected to the connection line 5 and is configured to check whether the sensor device 80 is operating normally.

The sensor device 80 may be connected to the tester through the connection line 5 such that the normal operation is checked, or may be connected to the control unit through the connection line 5 to transmit information regarding the operation of the injection molding apparatus 1.

Hereinafter, an injection molding apparatus according to another embodiment of the disclosure will be described. In the description, configurations identical to those described in the above will be omitted.

Figure 10:
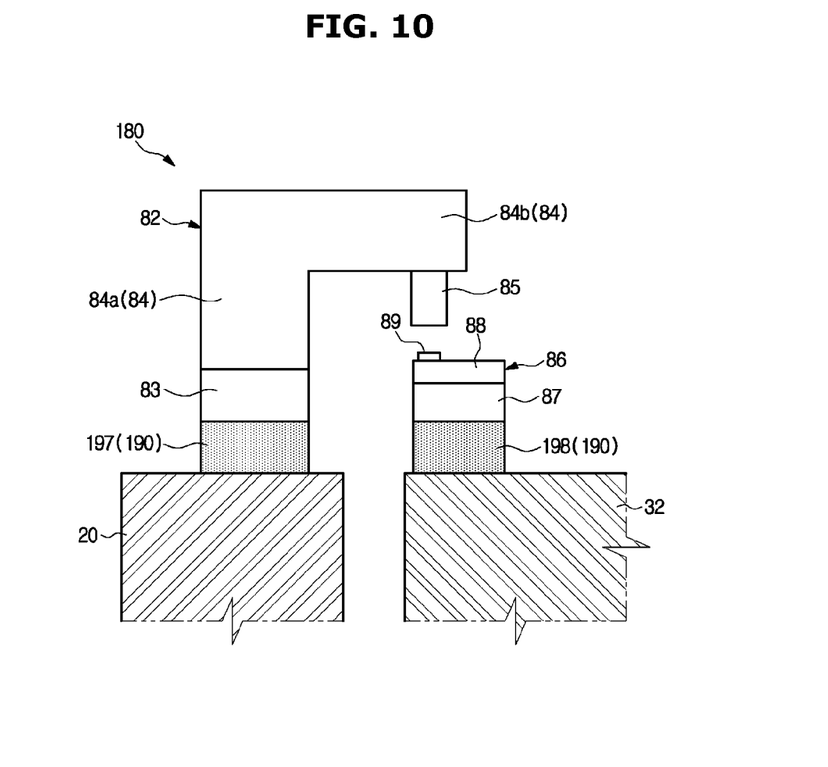
FIG. 10 is a cross-sectional view illustrating an injection molding apparatus according to another embodiment of the disclosure.

FIG. 10 is a cross-sectional view illustrating an injection molding apparatus according to another embodiment of the disclosure.

A sensor device 180 may include a mounting device.

The mounting device may include a mounting magnet 190 that allows the sensor device 180 to be easily separated from and mounted to the first mold 10 and the ejector plate 32. The mounting device may be configured to be detachable from the first mold 10 and the ejector plate 32 by the mounting magnet 190. That is, through the magnetic force of the mounting magnet 190, the mounting device may allow the fixed sensor 82 and the moving sensor 86 to be attached to the first mold 10 and the ejector plate 32, respectively.

The mounting magnet 190 may include a fixed magnet 197 for mounting the fixed sensor 82 to the first mold 10 and a moving magnet 198 for mounting the moving sensor 86 to the ejector plate 32. The mounting magnet 190 may be configured such that the sensor device 180 is detachable from each of the first mold 10 and the ejector plate 32. The mounting magnet 190 may be fixedly disposed on each of the fixed sensor 82 and the moving sensor 86.

One surface of the fixed magnet 197 is fixed to a lower surface of the fixed sensor 82, and the other surface of the fixed magnet 197 is configured to be attached to the base of the first mold 10 by an attractive force. One surface of the moving magnet 198 is fixed to a lower surface of the moving sensor 86, and the other surface of the moving magnet 198 is configured to be attached to the ejector plate 32 by an attractive force.

With such a configuration, the installation and removal of the sensor device 180 may be facilitated. As a result, the time required for installing the sensor device 180 in the mold may be reduced, and an additional configuration, such as a coupling hole for mounting or installing the sensor device 180 in the injection molding apparatus 1, may be omitted.

Hereinafter, an injection molding apparatus according to still another embodiment of the disclosure will be described. In the description, configurations identical to those described as above will be omitted.

Figure 11:
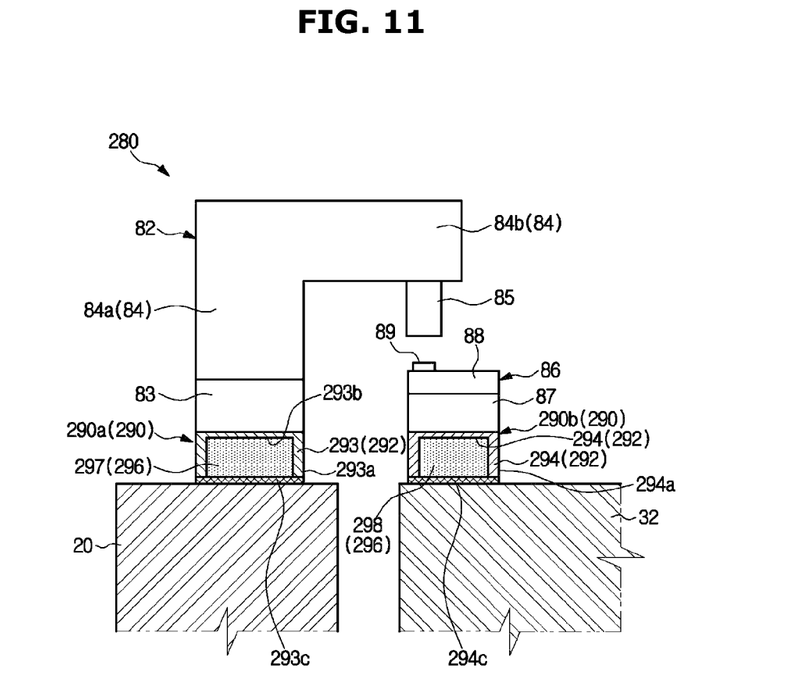
FIG. 11 is a cross-sectional view illustrating an injection molding apparatus according to still another embodiment of the disclosure.

FIG. 11 is a cross-sectional view illustrating an injection molding apparatus according to still another embodiment of the disclosure.

A sensor device 280 may include a mounting device 290.

The mounting device 290 includes a fixed mounting device 290*a* for mounting the fixed sensor 82 to the first mold 10 and a moving mounting device 290*b* for mounting the moving sensor 86 to the ejector plate 32. The mounting device 290 may be configured such that the sensor device 280 is detachable from each of the first mold 10 and the ejector plate 32.

The mounting device 290 may include a mounting magnet 296 that allows the sensor device 280 to be easily separated from and mounted to the first mold 10 and the ejector plate 32. The mounting device 290 may be configured to be detachable from the first mold 10 and the ejector plate 32 by a mounting magnet 296. That is, through the magnetic force of the mounting magnet 296, the mounting device 290 allows the fixed sensor 82 and the moving sensor 86 to be attached to the first mold and the ejector plate 32.

The mounting device 290 may include a mounting bracket 292. The mounting bracket 292 is configured such that the mounting magnet 296 is fixed to the fixed sensor 82 and the moving sensor 86. The mounting bracket 292 may include a fixed bracket 293 fixed to the fixed sensor 82 and a moving bracket 294 fixed to the moving sensor 86. The fixed bracket 293 and the moving bracket 294 may be screwed to the fixed sensor 82 and the moving sensor 86, respectively. However, the method of coupling the fixed sensor 82, the moving sensor 86, and the mounting bracket 292 is not limited thereto. The mounting bracket 292 may be variously configured as long as it can allow the mounting magnet 296 to be fixed to the fixed sensor 82 and the moving sensor 86.

The mounting bracket 292 may include bracket bodies 293*a* and 294*a* and mounting grooves 293*b* and 294*b* forming concave spaces in the bracket bodies 293*a* and 294*a* into which the mounting magnet 296 is inserted. The mounting grooves 293*b* and 294*b* may include a first mounting groove 293*b* formed in the fixed bracket 293 and a second mounting groove 294*b* formed in the moving bracket 294. The mounting grooves 293*b* and 294*b* may be formed in a shape corresponding to the shape of the mounting magnet 296.

The mounting magnet 296 is configured to be inserted into the mounting grooves 293*b* and 294*b*, and fixed to the mounting bracket 292. The mounting magnet 296 may include a fixed magnet 297 disposed on the fixed bracket 293 and a moving magnet 298 disposed on the moving bracket 294.

The mounting bracket 292 may include covers 293*c* and 294*c* covering mounting spaces formed by the mounting grooves 293b and 294b. The covers 293c and 294c may be configured such that the mounting magnet 296 inserted into the mounting space is not exposed to the outside. In addition, since the covers 293c and 294c are configured to prevent exposure of the mounting magnet 296, the mounting magnet 296 is prevented from making direct contact with the mold or the ejector plate 32. The covers 293c and 294c are rotatably disposed on the bracket bodies 293a and 294a to open and close the mounting spaces, allowing the mounting magnet 296 to be inserted into or withdrawn from the mounting space. The method of the covers 293c and 294c opening and closing the mounting space is not limited thereto. For example, guide rails may be installed on the bracket bodies 293a and 294a at surfaces that face the covers 293c and 294c so that the covers 293c and 294c are provided to be movable.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claim

The invention claimed is:

1. An injection molding apparatus comprising:
    a first mold and a second mold;
    an ejector plate provided on the first mold to reciprocate and configured to eject an injection molded object between the first mold and the second mold, wherein the ejector plate moves between a standby position and a separation position to which the ejector plate is moved from the standby position to press the molded object to separate the molded object from the first mold; and
    a sensor device having including:
    a moving sensor detachably attached to the ejector plate, and configured to detect a position of the ejector plate,
    a fixed sensor located on the first mold to detect the moving sensor, and detachably attached to the ejector plate, wherein the moving sensor and the fixed sensor are provided to face each other in the standby position, and
    a mounting device allowing the fixed sensor and the moving sensor to be detachably attached to the first mold and the ejector plate, respectively, wherein the mounting device includes a mounting bracket fixedly disposed on the fixed sensor and the moving sensor.

2. The injection molding apparatus of claim 1, wherein the moving sensor is detachably attached to the ejector plate by a magnetic force.

3. The injection molding apparatus of claim 1, wherein the mounting device further includes
    a mounting bracket fixedly disposed on the fixed sensor and the moving sensor; and
    a mounting magnet coupled to the mounting bracket, the mounting magnet allowing the fixed sensor and the moving sensor to be detachably attached to the first mold and the ejector plate, respectively.

4. The injection molding apparatus of claim 3, wherein when an attractive force of the mounting magnet is released, the moving sensor and the fixed sensor movable are allowed to detach.

5. The injection molding apparatus of claim 3, wherein the mounting bracket includes:
    a bracket body; and
    a mounting groove formed on one surface of the bracket body facing a contact target surface of the first mold or the ejector plate, the mounting groove into which the mounting magnet is inserted.

6. The injection molding apparatus of claim 1, wherein the mounting device includes a first mounting bracket and a second mounting bracket fixed to the fixed sensor and the moving sensor, and the fixed sensor includes:
    a first fixed sensor body fixed to the first mounting bracket and a second fixed sensor body protruding from the first fixed sensor body toward the ejector plate; and
    a first sensor located on a lower surface of the second fixed sensor body.

7. The injection molding apparatus of claim 6, wherein the moving sensor includes:
    a moving sensor body fixed to the second mounting bracket; and
    a second sensor located on an upper surface of the moving sensor body, configured to be detected by the first sensor.

8. The injection molding apparatus of claim 1, wherein the first mold includes:
    a core forming one surface of a cavity configured to form an injection object;
    a stand supporting the core; and
    a base spaced apart from the stand to form an accommodation space that allows the ejector plate to be movable, wherein the fixed sensor is provided to be located on the base.

9. The injection molding apparatus of claim 1, wherein the mounting device includes a mounting magnet having one surface come into contact with a lower surface of the fixed sensor and an other surface come into contact with a contact target surface of the first mold or the ejector plate.

10. The injection molding apparatus of claim 1, wherein the mounting device includes:
    a mounting bracket including an insertion space and a cover covering the insertion space, and fixedly disposed on the sensor device; and
    a mounting magnet disposed in the insertion space, the mounting magnet disposed to be hidden by the cover without being exposed to an outside.

11. The injection molding apparatus of claim 1, wherein the mounting device includes an adhesive.

* * * * *